Oct. 15, 1929.   W. MORAVA   1,731,825
COTTON PICKING MACHINE
Filed Aug. 1, 1927   6 Sheets-Sheet 1

Oct. 15, 1929.  W. MORAVA  1,731,825
COTTON PICKING MACHINE
Filed Aug. 1, 1927   6 Sheets-Sheet 2

Oct. 15, 1929.  W. MORAVA  1,731,825
COTTON PICKING MACHINE
Filed Aug. 1, 1927   6 Sheets-Sheet 5

Inventor:
Wenzel Morava,
By Dyrenforth, Lee, Chritton and Wiles,
Attys.

Oct. 15, 1929.  W. MORAVA  1,731,825
COTTON PICKING MACHINE
Filed Aug. 1, 1927   6 Sheets-Sheet 6
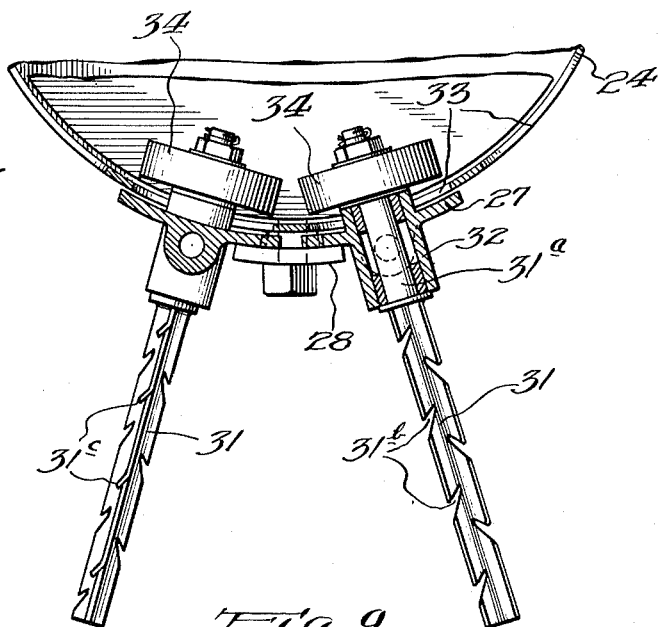
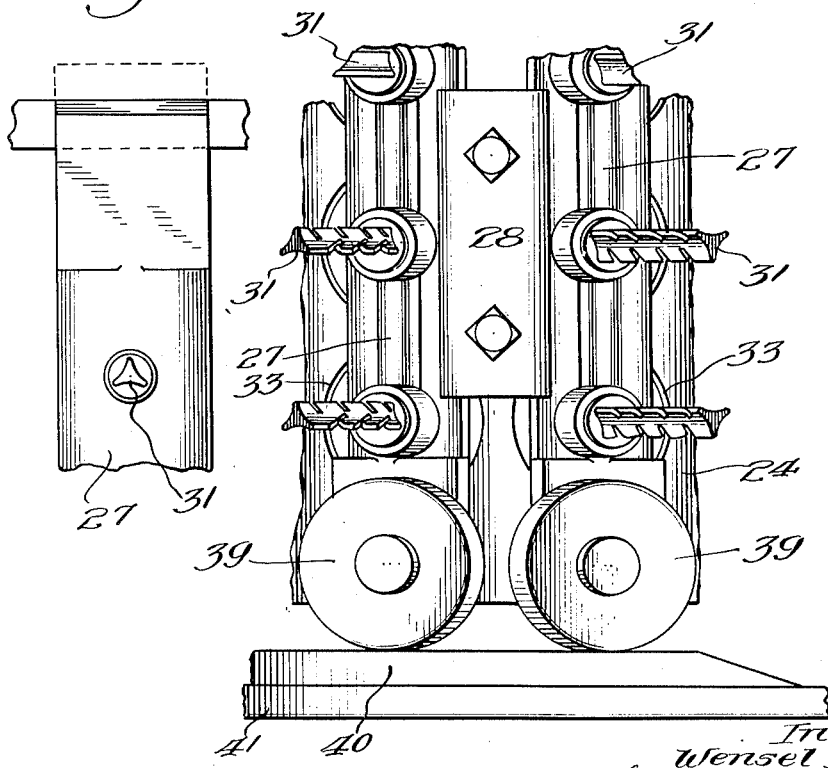

Patented Oct. 15, 1929

1,731,825

UNITED STATES PATENT OFFICE

WENSEL MORAVA, OF CHICAGO, ILLINOIS

COTTON-PICKING MACHINE

Application filed August 1, 1927. Serial No. 209,737.

This invention relates to improvements in cotton picking machines, and more especially to such a machine adapted for picking ripe cotton directly from the plants in the field.

In general, my machine resembles the machine disclosed in my copending application Serial No. 120,667, filed July 6, 1926, although the present machine has improvements over the machine disclosed in such application. One of the improvements consists of improved picking fingers, the construction and operation of which will be described more in detail hereinafter. Another feature of the present invention is an improvement in the saws for stripping the cotton from the picking fingers.

Other features and advantages of my invention will appear more fully as I proceed with my specification.

It is to be understood that where the present device is not described in detail, the construction and operation is substantially the same as that shown in the device disclosed in my copending application above referred to.

Figure 1:
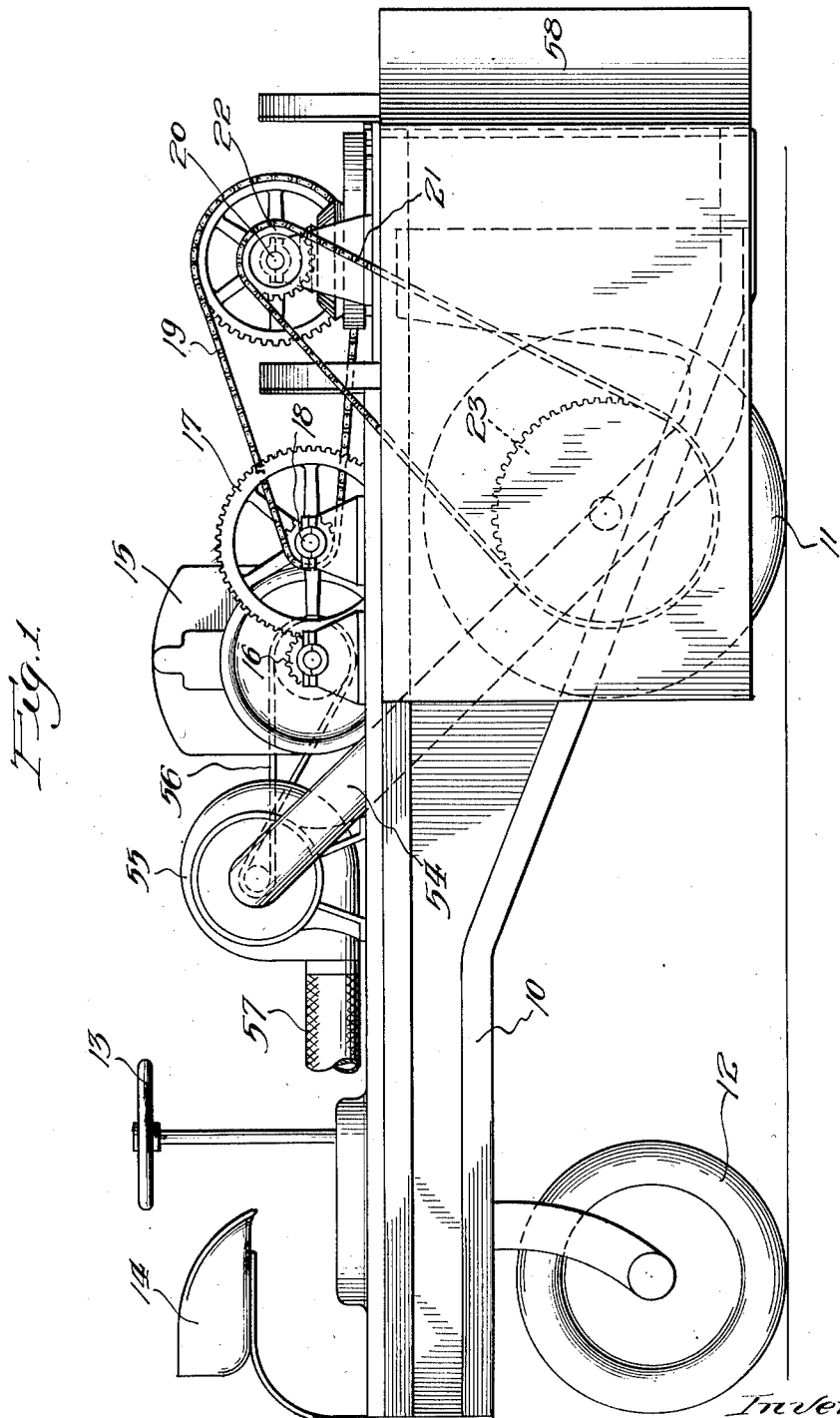
Figure 2:
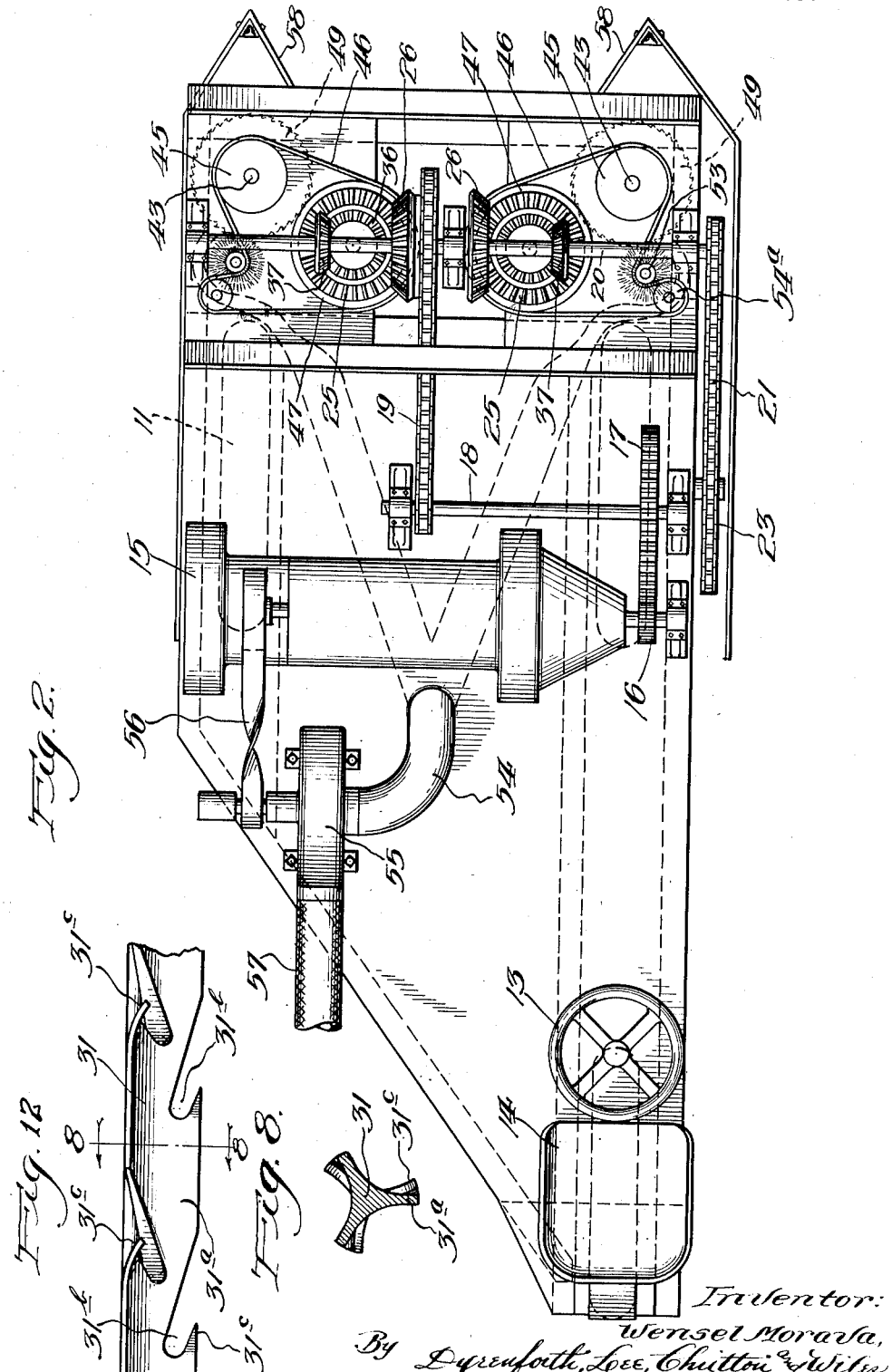
Figure 3:
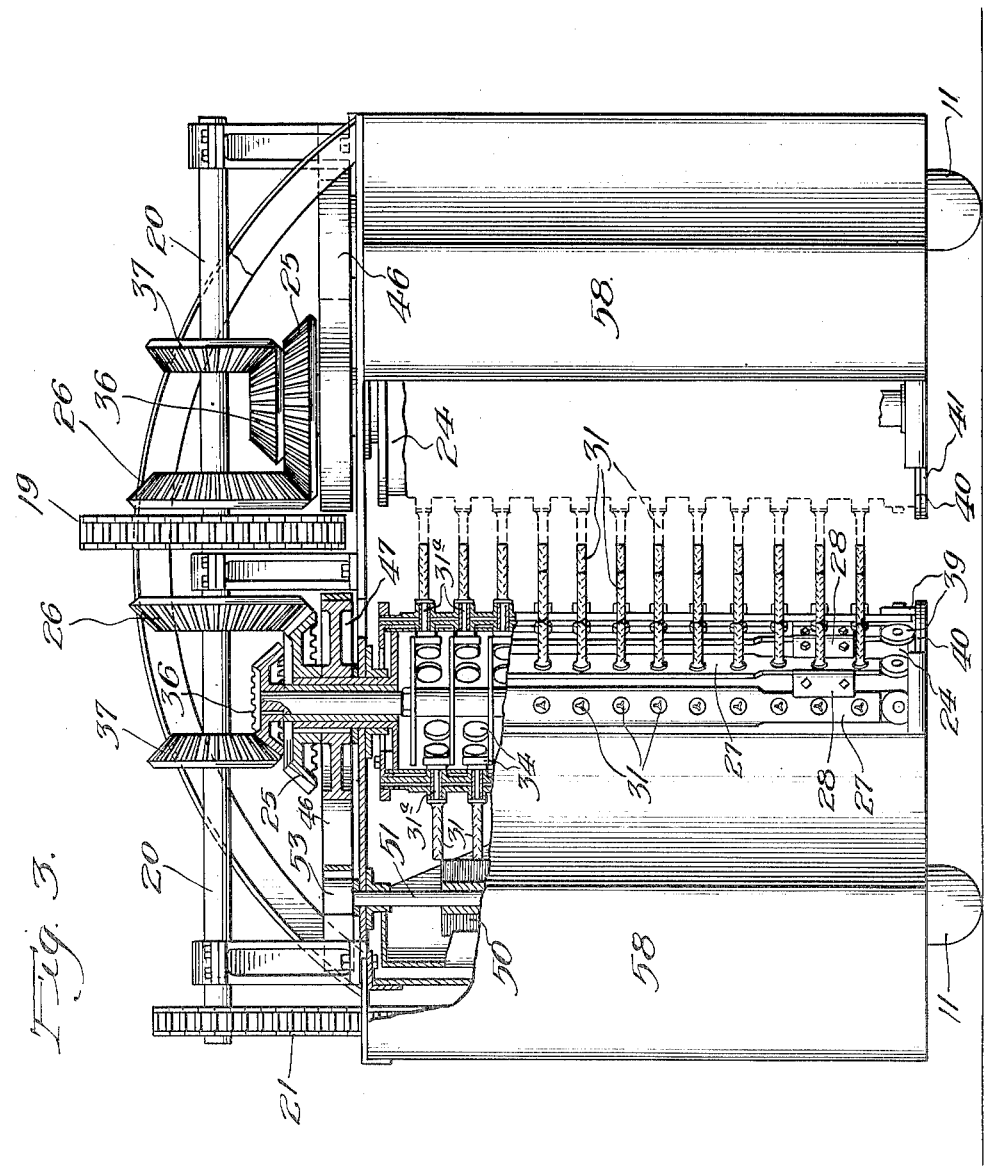
Figure 4:
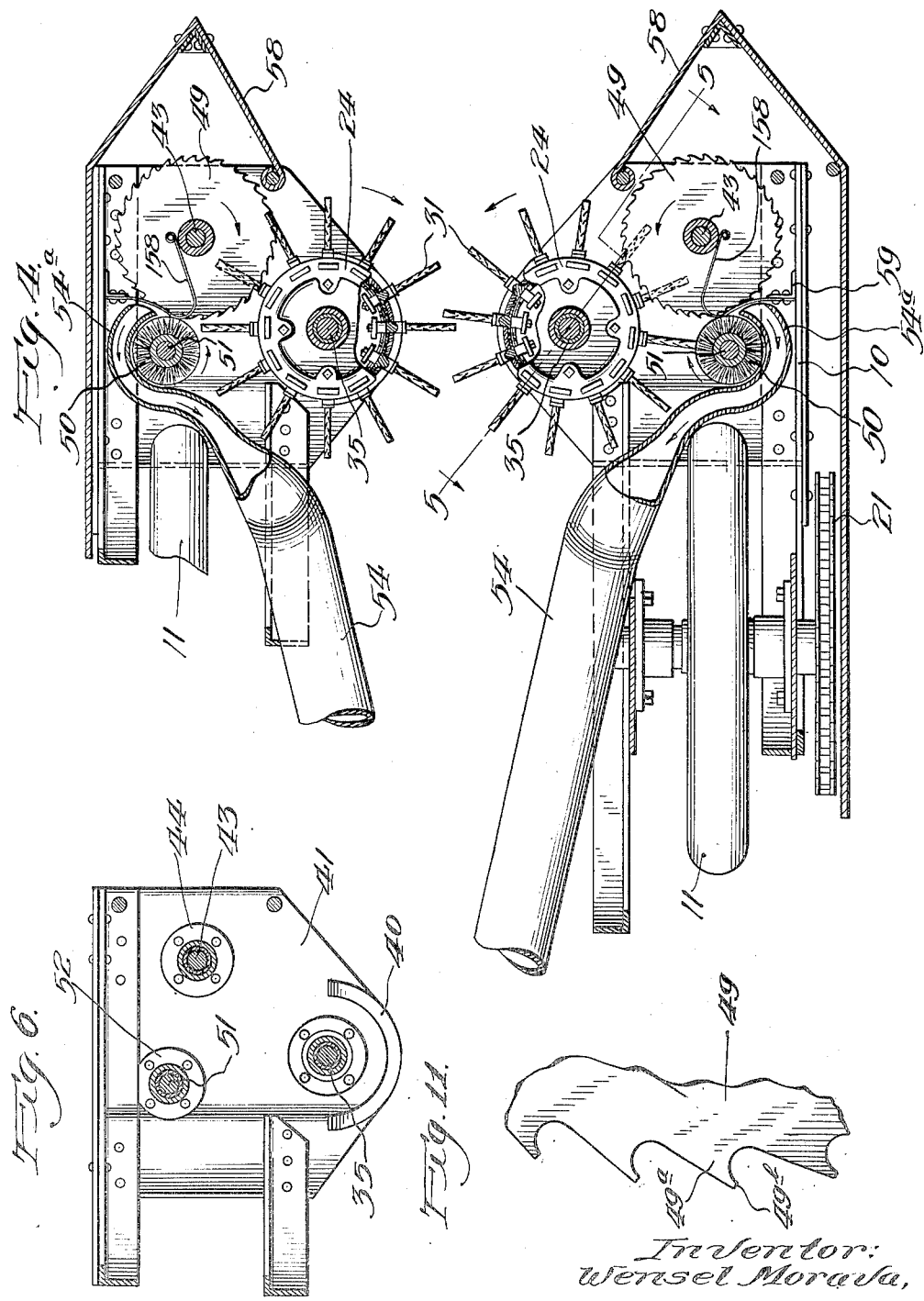
Figure 5:
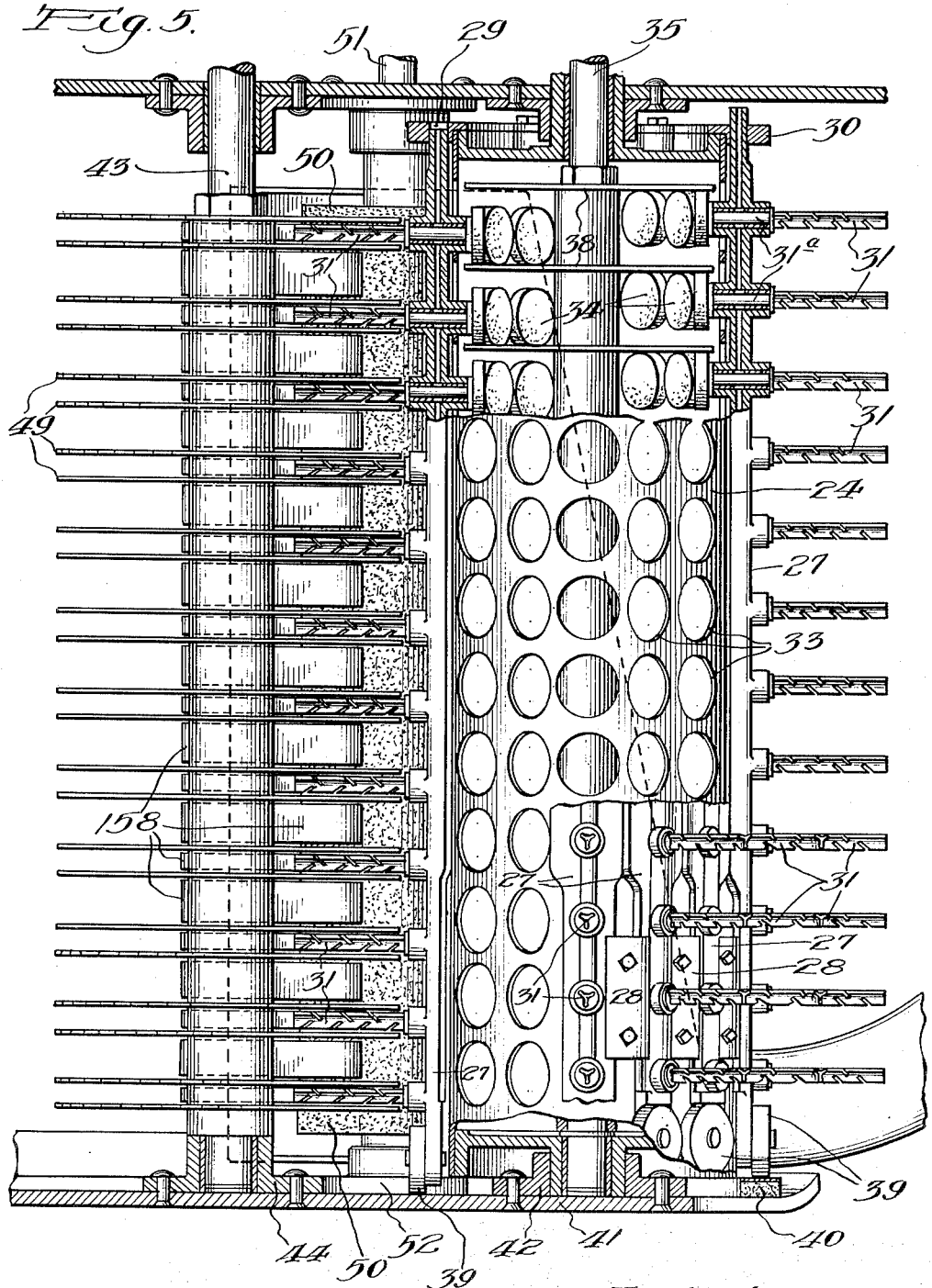

In that form of device embodying the features of my invention shown in the accompanying drawings, Figure 1 is a view in side elevation of a cotton picking machine, Fig. 2 is a top plan view thereof, Fig. 3 is a similar view in front elevation showing portions broken away, Fig. 4 is a horizontal sectional view taken through the picking mechanism, Fig. 5 is a view taken on an enlarged scale as indicated by the line 5—5 of Fig. 4, Fig. 6 is a top plan view of one of the bottom supporting plates carrying the lower ends of the picker finger driving shaft, saw shaft, and brush shaft, Fig. 7 is a detailed view on an enlarged scale of two of the picker fingers, Fig. 8 is a view taken as indicated by the line 8—8 of Fig. 12, Fig. 9 is a view on an enlarged scale of the lower end of one of the lower end picker finger cylinders, Fig. 10 is a view on an enlarged scale of the upper end of one of the picker finger staves, Fig. 11 is a view on an enlarged scale of a portion of the periphery of one of the saws, and Fig. 12 is a view on an enlarged scale of a portion of one of the picker fingers.

As shown in the drawings, 10 indicates a suitable frame or chassis here shown as supported on the two forward wheels 11, 11 and the single rear steering wheel 12 which is controlled by suitable steering wheel 13. 14 indicates a seat for a driver. 15 indicates a suitable motor such as, for example, an internal combustion motor adapted to propel the machine itself and drive the cotton picking mechanism. The shaft of the motor carries the pinion 16 driving the gear 17 mounted on the control shaft 18. By means of a chain 19 and suitable sprockets the control shaft 18 drives the picking machine mechanism driving shaft 20. The machine is propelled by means of a chain 21 driven by sprocket wheel 22 on the end of the shaft 20, which chain in turn drives one of the front wheels by means of the sprocket 23.

Suitable transmission gear, clutch, and the like, (not shown in detail) may be provided as desired.

The cotton picking mechanism comprises two parallel vertically arranged adjacent cylinders 24, 24 rotating toward each other and driven by the bevel gears 25, 25, which are in turn driven by the bevel gears 26, 26 mounted on the shaft 20. Each of the cylinders carries 12 vertically slidable staves 27, 27 slidably mounted on the cylinder 24 by means of the overlapping guide plates 28, 28 at their lower ends, the upper ends of the said staves operating through slots 29 in the flange 30 at the upper edge of the cylinder 24. Each of the staves 27 carries a series of picking fingers, here shown as 12 in number, indicated by 31. One of the features of my invention is the construction of these picking fingers which will be described more in detail hereinafter. Each of the fingers 31 is mounted on a shaft 31$^a$ rotatably mounted in a bearing 32 formed in the stave 27, the inner end of the bearing projecting through the cylinder 24. Suitable openings 33, 33 are provided in the wall of the cylinder 24 in order to accommodate the inner ends of the bearings 32 and permit the up and down sliding movement of the staves 27. The inner ends of the shafts 31$^a$ carry friction wheels 34, 34 inside of the cylinders 24 which are preferably made of rubber, fibre, or other suitable material.

Concentrically arranged within the cylinders 24 is a vertical shaft 35 carrying upon its upper end a bevel gear 36 driven by the bevel gear 37 on the shaft 20. It will be seen that the direction of rotation of the shaft 35 is in opposite direction from that of the cylinder 24. The shaft 35 carries a series of driving discs 38, 38 the peripheries of which are adapted to engage the friction wheels 34 on the inner ends of the picking fingers.

Mechanism is provided so that the picking fingers 31 will rotate in one direction during substantially half of the rotation of the cylinder 24 and in opposite direction during the other half. This is accomplished in the following manner. The staves 27 carrying the picking fingers, as stated above, are adapted for vertical sliding movement on the cylinders 24. The lower end of each stave is provided with a roller 39. 40 indicates a semicircular raised cam track on the plate 41 carrying the lower bearing 42 of the cylinder 24. During the rotation of the cylinder, the rollers 39 run up the track 40 during substantially half of such rotation, thus raising its staves. The disc 38 and friction roller 34 are so spaced and proportioned that when the staves are raised the friction rollers 34 will engage with the under sides of the discs 38. When lowered, they will engage with the upper sides of said discs. It will be seen, therefore, that during substantially half of the rotation of the cylinders the fingers will rotate in one direction and that their direction will be reversed during the other half of such rotation of the cylinders. The cam track 40 is so placed and arranged that the rotation of the picking fingers 31 will be in one direction during substantially the entire time that such fingers are in engagement with the cotton being picked from the plant, their direction of rotation being reversed after the fingers leave the plant in order to assist in the stripping operation.

Adjacent each of the cylinders 24 is arranged a shaft 43 having its lower end supported in a bearing member 44 on the plate 41. The upper end of the shaft 43 is provided with a suitable bearing member and also has a belt wheel 45 driven by a belt 46 from a belt wheel 47 mounted on the upper end of the shaft 35 carrying the cylinder 24. The shaft 43 carries a series of pairs of circular saws 49, the peripheries of which lie adjacent the picking fingers 31 as they leave the plant, each picking finger passing between a pair of saws. This constitutes an improvement over my old machine in which I provide only one saw for each picking finger. In the present device, there is a pair of saws for each finger so that in connection with each finger, a saw operates above and below the same. The saws 49 are rotated by means of the rotation of the shaft 43 and serve to strip the cotton from the fingers 31.

The cotton is removed from the saws 49 by means of a rapidly rotatable brush 50 mounted on the shaft 51, the lower end of which is carried in the bearing member 52 mounted on the plate 41. The upper end of the shaft 51 is driven by a small belt wheel 53 which is also driven by the belt 46. 54 indicates an idler belt wheel to take up slack.

The cotton is freed from the brushes 50 by means of centrifugal force and carried away through suction pipes 54, a suitable suction being maintained by the fan 55 driven by the belt 56 from the motor 15. From the fan 55, the cotton is discharged through the pipe 57 to any suitable receptacle, wagon or container (not shown).

58, 58 indicate converging guide plates adapted to direct the plants towards the picking fingers as the machine moves forward.

The arrows in the drawing indicate the direction of rotation of the various parts.

The construction of the picking fingers is most clearly shown in Figs. 7, 8, and 12. As there shown, it will be seen that the picking finger is provided with three longitudinal projections or ribs 31$^a$ throughout its entire length. Each of these ribs is provided with a series of rearwardly extending notches 31$^b$ leaving forwardly extending points or teeth 31$^c$ which are preferably bent slightly forward (considering the direction of rotation of the finger).

In Fig. 11 there is shown a portion of the periphery of one of the saws 49 and it will be seen that this saw is provided with teeth 49$^a$ the extreme points of which are made square as indicated by 49$^b$.

The ends of the suction pipes 54 terminate in nozzles 54$^a$ lying adjacent the brushes 50. 58 indicate spring steel guards between the respective pairs of saws, such guards having their outer ends attached to an angle iron 59 fastened to the inside of the main frame 10 and having their outer bearing against the shaft 43 carrying the saws. These guard plates assist in stripping the cotton from the saws and directing it to the brushes 50.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. In a cotton picking machine of the character described; two cylinders arranged parallel to each other; means for rotating said cylinders toward each other; a plurality of picking fingers projecting from said cylinders; means for rotating said fingers; and means for stripping material from said fingers, said stripping means including a separate pair of rotating circular saws for each finger, said finger adapted to pass between and close to such pair of saws, said saws of each pair being spaced from each other so as to permit both saws to operate on the picking finger passing therebetween.

2. In a cotton picking machine of the character described; two cylinders arranged parallel to each other; means for rotating said cylinders toward each other; a plurality of picking fingers projecting from said cylinders; means for rotating said cylinders; stripping means for removing material from said fingers, including a separate pair of saws for each finger; and a guard plate lying between adjacent saws of each pair.

3. Mechanism as claimed in claim 1 in which the saws of the stripping means are provided with forwardly projecting teeth having blunted ends.

4. Mechanism as claimed in claim 2 in which the saws of the stripping means have forwardly projecting teeth with blunted ends.

5. Mechanism as claimed in claim 2 in which the guard plate extends substantially radially from the periphery of the saws to a point near the center thereof.

In testimony whereof, I have hereunto set my hand and seal this 28th day of July, A. D. 1927.

WENSEL MORAVA.